United States Patent
Abdelazem et al.

(10) Patent No.: US 11,119,247 B2
(45) Date of Patent: *Sep. 14, 2021

(54) MEASUREMENT APPARATUS WITH CIRCUITRY FOR MEASURING ACCELERATION

(71) Applicant: KING FAHD UNIVERSITY OF PETROLEUM AND MINERALS, Dhahran (SA)

(72) Inventors: Sohaib Abdelazem, Dhahran (SA); Watheq Al-Basheer, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 38 days.

This patent is subject to a terminal disclaimer.

(21) Appl. No.: 16/138,762

(22) Filed: Sep. 21, 2018

(65) Prior Publication Data

US 2019/0025457 A1    Jan. 24, 2019

Related U.S. Application Data

(63) Continuation of application No. 16/000,623, filed on Jun. 5, 2018, now Pat. No. 10,114,145, which is a (Continued)

(51) Int. Cl.
G01V 7/04    (2006.01)
G01V 7/14    (2006.01)

(52) U.S. Cl.
CPC . *G01V 7/14* (2013.01); *G01V 7/04* (2013.01)

(58) Field of Classification Search
CPC .................................. G01V 7/14; G01V 7/04
See application file for complete search history.

(56) References Cited

U.S. PATENT DOCUMENTS 5,585,786 A    12/1996    Clark et al.

FOREIGN PATENT DOCUMENTS

| CA | 2261510 A1 | 8/2000 |
|----|-----------|--------|
| CN | 202119923 U | 1/2012 |
| CN | 203811820 U | 9/2014 |

OTHER PUBLICATIONS

University of Florida, "Acceleration Due to Gravity", URL: http://www.phys.ufl.edu/~deserio/LabVIEW/Photogate/AccelTutor.pdf, 14 Pages total, (Aug. 2002).

(Continued)

*Primary Examiner* — Robert R Raevis
(74) *Attorney, Agent, or Firm* — Oblon, McClelland, Maier & Neustadt, L.L.P.

(57) ABSTRACT

An apparatus and method for measuring a local acceleration of gravity includes releasing a ferrous rod having a regular alternating pattern of reflective and non-reflective portions on a surface thereof from an electromagnetic holder so that the rod falls with a substantially vertical acceleration and substantially no angular velocity about a center of mass of the rod. The falling rod is illuminated with a light emitting diode (LED) configured to emit infrared (IR) light, and IR light emitted by the LED and reflected by the falling rod is detected with a photodiode. A two-state signal is generated corresponding to an illumination state of the photodiode by the reflected IR light. Times of transitions between the two states in the generated signal are calculated to determine kinematic data, and the kinematic data is fitted to a predetermined curve to calculate a local acceleration of gravity.

8 Claims, 7 Drawing Sheets

Related U.S. Application Data continuation of application No. 15/003,460, filed on Jan. 21, 2016, now Pat. No. 10,012,757.

(56) References Cited

OTHER PUBLICATIONS

Data Harvest Smart Q Technology, "Light Gate", URL: http://www.data-harvest.co.uk/docs/uploads/3250_ds054_3_light_gate.pdf, 12 Pages total, (Jul. 2013).

English Translation of Bibliographic Data and Description of CN203811820U, Date: Sep. 2014, Publisher: European Patent Office, Espacenet, Pertinent pages: 5.

Author: Zengqiang John Liu, Title: Open Source Electronics for Laboratory Physics, Date: Jul 25, 2015, Publisher: the Repository at St Cloud State, Cloud State University, Pertinent pages: 5.

Author: unknown, Title: Timed free fall: Ball drops 2 meters through electronic timing gate, Date: Jan. 10, 2013, Publisher: Physics @ Berkeley, pp. 1.

MEASUREMENT APPARATUS WITH CIRCUITRY FOR MEASURING ACCELERATION

CROSS-REFERENCE TO RELATED APPLICATIONS

The present application is a Continuation of Ser. No. 16/000,623, now allowed, having a filing date of Jun. 5, 2014, which is a Continuation of Ser. No. 15/003,460, now U.S. Pat. No. 10,012,757 having a filing date of Jan. 21, 2016.

BACKGROUND

Field of the Disclosure

The present disclosure relates to methods and apparatus for measuring linear acceleration, and more specifically relates to methods and apparatus for measuring a local acceleration of gravity.

Description of the Related Art

Since the beginning of human civilization, many theories, hypotheses, and experiments were proposed to understand the dynamics of falling objects. The Greek philosopher Aristotle suggested that objects fall at speeds proportional to their masses. Aristotle's incorrect theory was discredited by Galileo's landmark experiment, where according to legend, Galileo dropped balls of different densities and masses from the tower of Pisa. Galileo noticed that if released simultaneously from rest, all objects tend to land at the same time, concluding that time of fall is independent of the mass of the object.

In the last few decades, and as a result of many advancements in science and technology, many techniques have been proposed to provide very precise and accurate measurement of the acceleration due to gravity. The basis of techniques used to measure acceleration due to gravity varies from using conventional mechanical methods, to manipulating cold atoms, to employing atomic interferometers. Although most of the aforementioned techniques can yield very accurate and precise measurement of the acceleration due to gravity, when using these techniques in introductory physics laboratory there are a few shortcomings.

This is due to the fact that these techniques require expensive experimental setups involving many components. Additionally, these techniques are difficult to perform and require near-ideal conditions to obtain reliable results. Last, but not the least, these techniques necessitate the hiring of highly-trained personnel. All these limitations can make the employment of these advanced techniques in teaching laboratories a difficult endeavor. The measurement of the acceleration due to gravity is now a standard teaching experiment in many introductory physics laboratory courses. Thus, most physics student labs desire an approach to measuring the acceleration due to gravity by using a method that is economical, simple, and safe, and which can also yield a reasonable value of a local acceleration of gravity g.

Of the many simple techniques employed to measure acceleration due to gravity in standard physics books, the period of a pendulum's oscillation and the time of fall of an object as a function of height are the most commonly used methods. While the pendulum method can yield a relatively wide range of variation in the value of g due to effect of air resistance and other systematic errors, the latter method can also be very sensitive to imprecise measurements of times and heights of fall, consequently, causing significant variation in determining the value of g. In the last few decades, many experimental techniques have been proposed to replace these two simple methods to evaluate g. However, the application of these techniques was either deemed expensive or inaccurate, and sometimes unsafe.

SUMMARY

One embodiment of the invention is drawn to an apparatus for measuring a local acceleration of gravity. The apparatus includes an electromagnetic holder configured to releasably hold a ferrous rod having a regular alternating pattern of reflective and non-reflective portions on its surface. An infrared (IR) transceiver includes a light emitting diode (LED) configured to emit IR light, and a photodiode configured to detect IR light emitted by the LED which is reflected off the ferrous rod back to the IR transceiver. An output circuit of the IR transceiver outputs a two-state signal corresponding to an illumination state of the photodiode by the reflected IR light. A power supply is configured to the power the electromagnetic holder and the IR transceiver.

A controller is configured to control a current from the power supply to the electromagnetic holder to the cause electromagnetic holder to release the rod, cause the IR transceiver to emit IR light, receive the signal from the IR transceiver, and calculate times of transitions between the two states in the received signal to determine kinematic data. The controller calculates a local acceleration of gravity from a fit to the kinematic data.

Another embodiment of the invention is drawn to a method for measuring a local acceleration of gravity. The method includes releasing an object having a regular alternating pattern of reflective and non-reflective portions on a surface thereof from an electromagnetic holder so that the object falls with a substantially vertical acceleration and substantially no angular velocity about a center of mass of the object. The method also includes illuminating the falling object with a light emitting diode (LED) configured to emit infrared (IR) light, and detecting IR light emitted by the LED and reflected by the falling object with a photodiode configured to detect IR light emitted by the LED and reflected by the falling object A two-state signal is generated based on the detecting. The two-state signal corresponds to an illumination state of the photodiode by the reflected IR light. Times of transitions between the two states in the generated signal are calculated to determine kinematic data, and the kinematic data is fitted to a predetermined curve. A local acceleration of gravity is calculated from the fitting.

Another embodiment of the invention is drawn to a non-transitory computer-readable medium storing a program thereon for causing a computer to perform a method for measuring a local acceleration of gravity. The method includes releasing an object having a regular alternating pattern of reflective and non-reflective portions on a surface thereof from an electromagnetic holder so that the object falls with a substantially vertical acceleration and substantially no angular velocity about a center of mass of the object. The method also includes illuminating the falling object with a light emitting diode (LED) configured to emit infrared (IR) light, and detecting IR light emitted by the LED and reflected by the falling object with a photodiode configured to detect IR light emitted by the LED and reflected by the falling object.

A two-state signal is generated based on the detecting. The two-state signal corresponds to an illumination state of the photodiode by the reflected IR light. Times of transitions between the two states in the generated signal are calculated to determine kinematic data, and the kinematic data is fitted to a predetermined curve. A local acceleration of gravity is calculated from the fitting.

BRIEF DESCRIPTION OF THE DRAWINGS

A more complete appreciation of the disclosed embodiments and the attendant advantages thereof will be more readily obtained by reference to the accompanying drawings when considered in connection with following detailed description.

DETAILED DESCRIPTION

Figure 1:
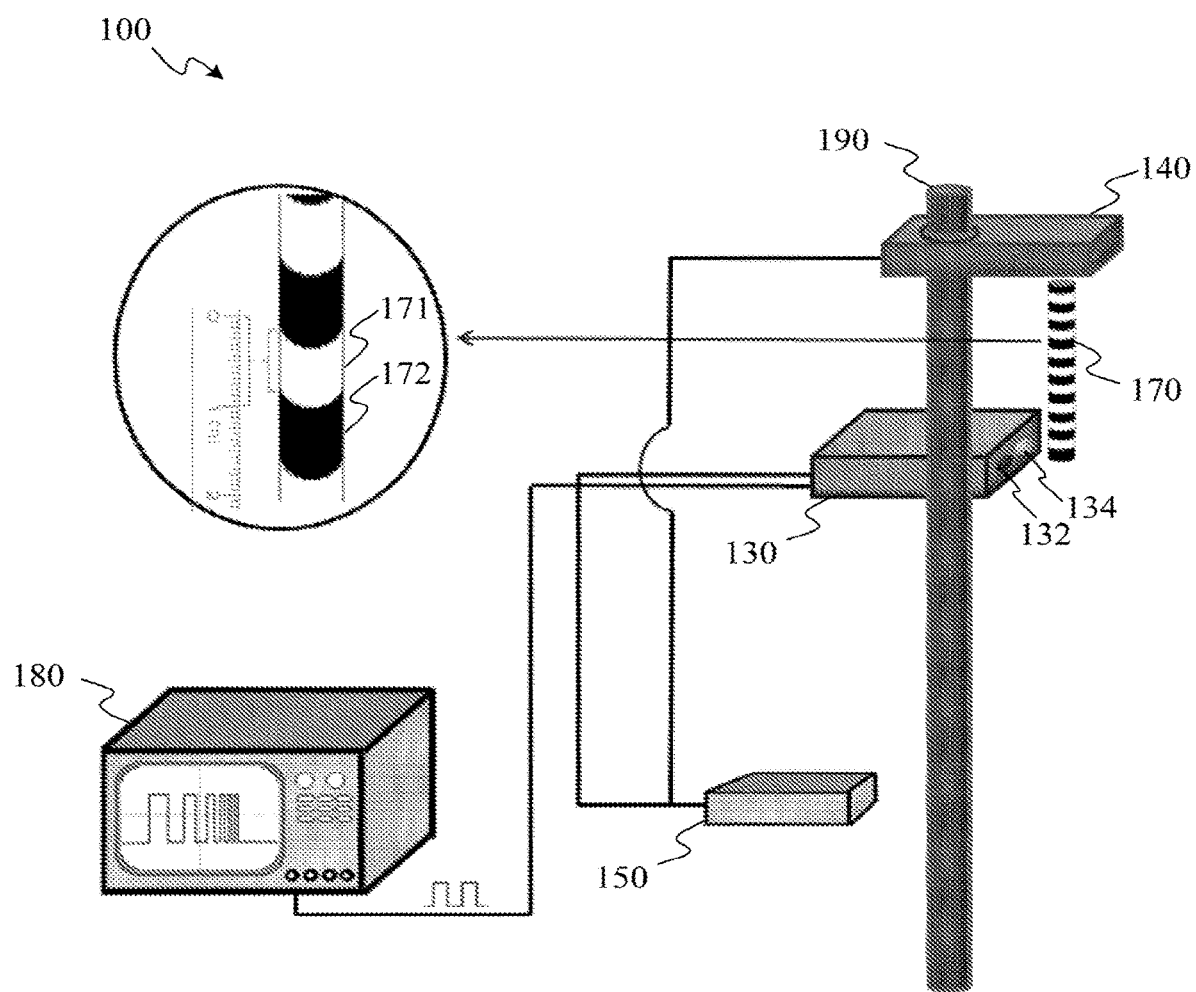
FIG. 1 illustrates an exemplary embodiment of an apparatus for measuring a local acceleration of gravity.

The following descriptions are meant to further clarify the present disclosure by giving specific examples and embodiments of the disclosure. These embodiments are meant to be illustrative rather than exhaustive. The full scope of the disclosure is not limited to any particular embodiment disclosed in this specification, but rather is defined by the claims.

One embodiment of the invention is drawn to an apparatus for measuring a local acceleration of gravity. The apparatus includes an electromagnetic holder configured to releasably hold a ferrous rod having a regular alternating pattern of reflective and non-reflective portions on its surface. An infrared (IR) transceiver includes a light emitting diode (LED) configured to emit IR light, and a photodiode configured to detect IR light emitted by the LED which is reflected off the ferrous rod back to the IR transceiver. An output circuit of the IR transceiver outputs a two-state signal corresponding to an illumination state of the photodiode by the reflected IR light.

A power supply is configured to the power the electromagnetic holder and the IR transceiver. A controller is configured to control a current from the power supply to the electromagnetic holder to the cause electromagnetic holder to release the rod, cause the IR transceiver to emit IR light, receive the signal from the IR transceiver, and calculate times of transitions between the two states in the received signal to determine kinematic data. The controller calculates a local acceleration of gravity from a fit to the kinematic data.

In an aspect of the invention, the apparatus includes the ferrous rod having the regular alternating pattern of reflective and non-reflective portions on the surface thereof.

In an aspect of the invention, the rod has a substantially cylindrical shape.

In an aspect of the invention, the alternating pattern is formed at regular intervals of 1 centimeter.

In an aspect of the invention, the alternating pattern is formed by etching a surface of the rod.

In an aspect of the invention, the alternating pattern is formed by applying a black resin, epoxy, or paint to a surface of the ferrous rod.

In an aspect of the invention, transitions between the reflective portions and the non-reflective portions of the alternating pattern are blurred by varying a concentration of an IR absorber in the black resin, epoxy, or paint in a portion of the alternating pattern at the transition.

In an aspect of the invention, the surface of the rod is shaped in a pattern corresponding to the reflective portions and the non-reflective portions of the rod.

In an aspect of the invention, the surface of the rod is shaped in a concave pattern corresponding to the reflective portions and the non-reflective portions of the rod.

In an aspect of the invention, the surface of the rod is shaped in a concave pattern corresponding to the reflective portions and the non-reflective portions of the rod.

In an aspect of the invention, the alternating pattern is formed by applying a black resin, epoxy, or paint to a surface of the ferrous rod. In an aspect of the invention, the alternating pattern is formed by printing a black and white pattern on paper and fixing the paper to the ferrous rod.

Another embodiment of the invention is drawn to a method for measuring a local acceleration of gravity. The method includes releasing an object having a regular alternating pattern of reflective and non-reflective portions on a surface thereof from an electromagnetic holder so that the object falls with a substantially vertical acceleration and substantially no angular velocity about a center of mass of the object. The method also includes illuminating the falling object with a light emitting diode (LED) configured to emit infrared (IR) light, and detecting IR light emitted by the LED and reflected by the falling rod with a photodiode configured to detect IR light emitted by the LED and reflected by the falling object.

A two-state signal is generated based on the detecting. The two-state signal corresponds to an illumination state of the photodiode by the reflected IR light. Times of transitions between the two states in the generated signal are calculated to determine kinematic data, and the kinematic data is fitted to a predetermined curve. A local acceleration of gravity is calculated from the fitting.

In an aspect of the invention, the method further includes a second releasing of the object having the regular alternating pattern of reflective and non-reflective portions on the surface thereof from the electromagnetic holder so that the object falls with a substantially vertical acceleration and substantially no angular velocity about the center of mass of the object, and a second illuminating of the falling object with a light emitting diode (LED) configured to emit infrared (IR) light. A second detecting of IR light emitted by the LED and reflected by the falling object with a photodiode configured to detect IR light emitted by the LED and reflected by the falling object is performed, and a second generating a two-state signal based on the detecting, the two-state signal corresponding to an illumination state of the photodiode by the reflected IR light.

A second calculating times of transitions between the two states in the generated signal is performed to determine kinematic data for the second releasing. The fitting the kinematic data to the predetermined curve includes the kinematic data from the first calculating and the kinematic data from the second calculating.

Another embodiment of the invention is drawn to a non-transitory computer-readable medium storing a program thereon for causing a computer to perform a method for measuring a local acceleration of gravity. The method includes releasing a ferrous rod having a regular alternating pattern of reflective and non-reflective portions on a surface thereof from an electromagnetic holder so that the rod falls with a substantially vertical acceleration and substantially no angular velocity about a center of mass of the rod. The method also includes illuminating the falling rod with a light emitting diode (LED) configured to emit infrared (IR) light, and detecting IR light emitted by the LED and reflected by the falling rod with a photodiode configured to detect IR light emitted by the LED and reflected by the falling rod.

A two-state signal is generated based on the detecting. The two-state signal corresponds to an illumination state of the photodiode by the reflected IR light. Times of transitions between the two states in the generated signal are calculated to determine kinematic data, and the kinematic data is fitted to a predetermined curve. A local acceleration of gravity is calculated from the fitting.

FIG. 1 illustrates an exemplary embodiment of an apparatus 100 for measuring a local acceleration of gravity. The apparatus 100 has an electromagnet 140 mounted on a vertical beam 190 to achieve free-fall release of an object. A height of the beam 190 should be chosen so that the object released does not contact the floor until after required data has been recorded, i.e., more than twice a length of the object. However, height in excess of 2 meters may make the apparatus more difficult for students to work with, especially young students. For example, the height of the beam could be 2.1 meters for an object having a length of 1.0 meter. Preferably, the beam 190 is 2.0 meters in height or less, and more preferably 1.5 meters in height or less.

The falling object can be a ferrous rod 170. Alternatively, the rod 170 may be of a ferromagnetic non-ferrous material, such as nickel, cobalt, or the like, such that the rod 170 can be held by the electromagnet 140. The rod 170 is marked with a regular alternating pattern of reflective and non-reflective portions. The pattern is configured on a surface portion of the rod. The pattern may extend around an entirety of the circumference of the rod, but this is not required. The regular alternating pattern preferably has a constant pitch, with the reflective and non-reflective portions having equal length. A pitch of the regular pattern is preferably between 1 cm per pair and 5 cm per pair, and more preferably is 2 cm per pair, with the reflective portion and the non-reflective portion of the 2 cm pair each being 1 cm in length. A modulation of reflected IR light produced by the alternating pattern of reflective and non-reflective portions will be used to determine the kinematics of the falling rod 170, and thus a local acceleration of gravity. A number of transitions between reflective and non-reflective portions of the rod 170 will determine a number of data points generated.

The rod 170 may have any cross-sectional shape, but is elongated so as to allow the regular alternating pattern of reflective and non-reflective portions. The rod 170 should be long enough relative to a length of the reflective and non-reflective portions in the regular alternating pattern that a substantial number of data points will generated for fitting to a quadratic curve. The rod 170 should also be heavy enough and sized so that the effects of air resistance will be negligible during the operation of the apparatus. The rod 170 is preferably less than 1 meter in length, and more preferably less than half a meter in length. Preferably, the rod 170 has a cylindrical shape, and preferably the rod 170 has a radius of 0.02 m or less, and more preferably 0.01 m or less. Preferably, a mass of the rod is between 0.1 kg and 1 kg, and more preferably between 0.1 kg and 0.5 kg. For example, a 0.13 kg cylindrical homogenous rod of 0.01 m radius and 0.19 m length with a metallic tip to establish contact with the electromagnet could be used.

The regular alternating pattern of reflective portions 171 and non-reflective portions 172 can be formed on or fixed to a surface of the rod 170 in a number of ways available to one of ordinary skill in the art. For example, a paper of 0.01 m equal-width white and black stripes, printed, for example, using a laser printer, can be wrapped on the rod 170. The regular alternating pattern can also be marked on the rod, for example, by applying a black resin, epoxy, or paint to the rod 170 to form the non-reflective portions. The black resin, epoxy, or paint can include, for example, charcoal, black iron oxide, and the like, to absorb the IR light. The reflective portions of the rod can be formed by a natural metallic surface of the rod, a chemical or mechanical polishing of the surface of the rod, or by applying an IR reflective resin, epoxy, or paint to the rod 170. The IR reflective resin, epoxy, or paint can include, for example, zinc oxide, titanium dioxide, and the like, to reflect the IR light. Especially in the near IR and short wave IR, that is, wavelengths from 0.8 microns to 3 microns, resins, epoxies, and paints which are white, or reflective, in the visible spectrum are frequently white, or reflective, in the near IR and short wave IR, and resins, epoxies, and paints which are black, or non-reflective, in the visible spectrum are frequently black, or non-reflective, in the near IR and short wave IR. Alternatively, a regular alternating pattern of different reflectivities can be etched onto the surface of the rod.

The reflective portions 171 and the non-reflective portions 172 described above are configured to each have a uniform reflectance value, the reflective portions 171 having a high reflectance and the non-reflective portions 172 having a low reflectance, with the transition between the two reflectance values being as sharp as possible so as to produce the best data. This results in a reflected IR signal which resembles a square wave, i.e., having sharp transitions. However, the rod 170 may also be configured so that the transitions are less sharp. This provides variation in the data, introducing a known "noise" or error in the data, which can be used as an additional resource for instruction regarding measurement error in a classroom environment.

Figure 2:
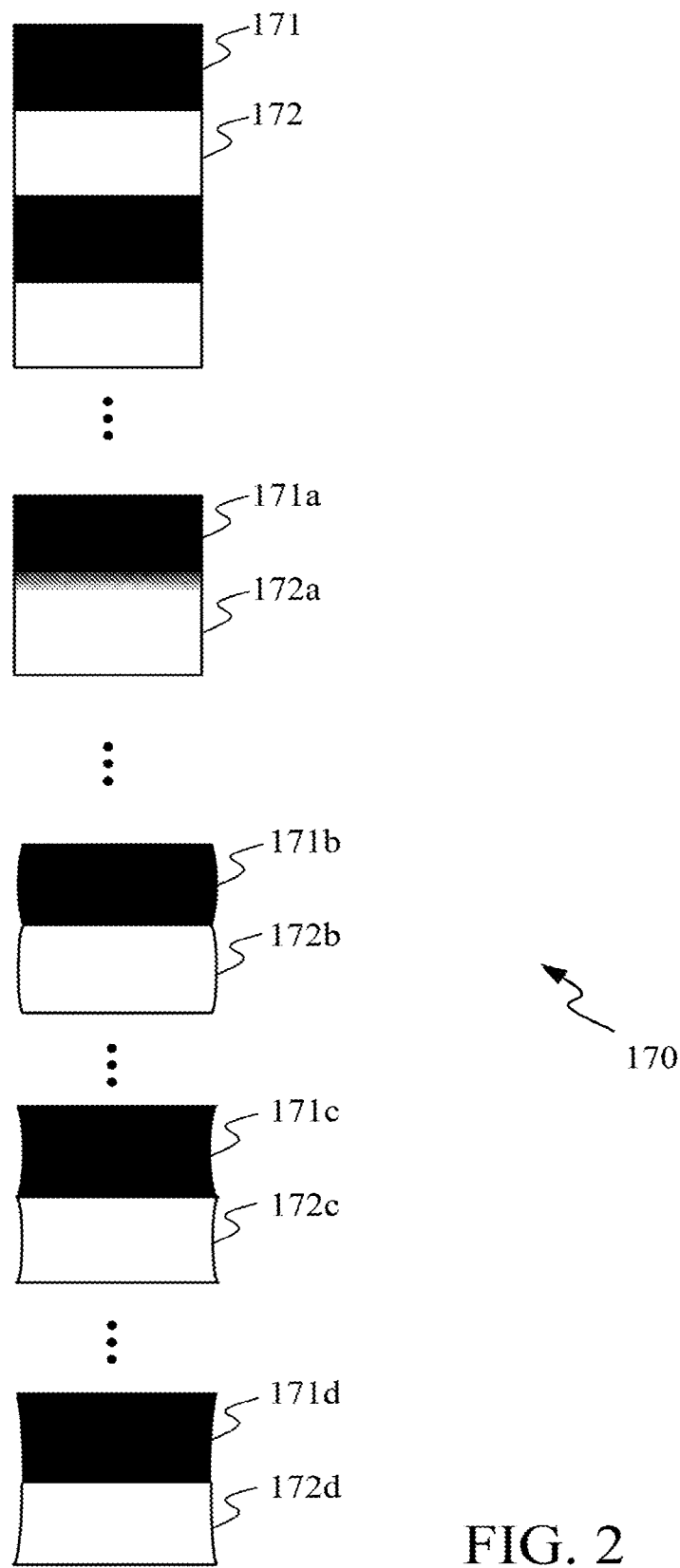
FIG. 2 illustrates variation in rod geometry and reflectance.

For example, as shown in FIG. 2, the transitions can be made less sharp by varying the reflectance of the reflective portions 171a and the non-reflective portions 172a gradually at an interface between the portions. The ellipses indicate portions of the rod 170 omitted from the drawing. In an embodiment where the non-reflective portions 172 are formed by marking the rod 170 with a black resin, epoxy, or paint, the IR absorbing material in the resin, epoxy, or paint may be varied over an area of 1 mm or 2 mm in width, for example, resulting in transitions between the reflective portions and non-reflective portions which are not sharp as in a square wave, but spread out as in a trapezoid wave or other waveform. In an embodiment where the non-reflective portions 172 are formed by etching the rod 170, the etching could be transitioned varied over an area of 1 mm or 2 mm in width, for example, between no etching and full etching, resulting in transitions between the reflective portions and non-reflective portions which are not sharp as in a square wave.

In another example, the transitions can be made less sharp by varying not the reflectance values of the reflective portions 171 and the non-reflective portions 172, but rather a geometry of the surface of the rod 170 having the reflective portions 171 and the non-reflective portions 172. A non-uniformity or irregularity in the geometry of the surface of the rod 170, for example, having convex surfaces on the reflective portions 171b and non-reflective portions 172b, concave surfaces on the reflective portions 171c and non-reflective portions 172c, or otherwise irregular surfaces on the reflective portions 171d and non-reflective portions 172d, can also result in transitions between the reflective portions and non-reflective portions which are not sharp as in a square wave, but spread out as in a trapezoid wave or other waveform.

All the types of transitions indicated above can be incorporated on the rod 170, as shown in FIG. 2, either individually or in combination, so as to produce a data set having portions with relatively little error (for the portion of the rod with the sharply divided reflective portions 171 and non-reflective portions 172), as well as portions in which a systematic error is introduced by reflective portions 171a, 171b, 171c, and 171d, non-reflective portions 172a, 172b, 172c, and 172d, and the corresponding variable transitions between reflective portions and non-reflective portions. The regular alternating pattern of reflective and non-reflective portions can also be configured to have a sharpness of the transitions which decreases along a the length of the rod.

An IR transceiver 130 is disposed below and to a side of a position of the rod 170 when held by the electromagnet 140. The IR transceiver 130 is preferably not more than 5 cm below an end of the rod 170, and more preferably not more than 2 cm below the end of the rod 170. The IR transceiver 130 is configured with an IR light emitting diode (LED) 132 and an IR photodiode 134 which is sensitive to the wavelengths of IR light emitted by the IR LED 132. The IR LED 132 is preferably an amorphous silicon (a-Si) diode, a silicon (Si) diode, or an indium gallium arsenide (InGaAs) diode. The IR LED 132 emits IR light having wavelengths preferably between 0.8 microns and 5 microns, and more preferably between 0.8 microns and 2.5 microns. The IR LED 132 emits light which does not directly illuminate the IR photodiode 134 but rather, after the electromagnet 140 releases the rod 170, indirectly illuminates the IR photodiode 134 via reflected light from the falling rod 170. The pattern of the reflected light is modulated by the regular alternating pattern of reflective portions 171 and non-reflective portions 172 of the rod 170.

The IR LED 132 and the IR photodiode 134 are disposed at a same height and in proximity to one another, and near a path of the rod 170 after its release from the electromagnet 140. For example, the IR LED 132 and the IR photodiode 134 can be separated in the IR transceiver 130 by a 3 mm horizontal distance, and can be positioned horizontally to point in a same direction. The IR LED 132 and the IR photodiode 134 are disposed near the path of the falling rod 170 in order to have a strong reflected return of the IR light from the rod, preferably within 10 cm of the path of the falling rod, and more preferably within 5 cm of the path of the falling rod.

An output circuit of the IR transceiver 130 outputs a signal which is a non-periodic two-state rectangular wave, for example, at the 5 Volt (V) and 0 V levels, corresponding to illuminated and non-illuminated states, respectively, of the IR photodiode 132. A digital oscilloscope 180 is set to a capture mode and is used to record and observe the output signal at a high resolution. For example, the sampling rate of the signal output from the IR transceiver 130 by the digital oscilloscope 180 could be 100K samples per second or higher.

The IR transceiver 130 is connected to a DC power supply 150, for example, of 5 V and 1 Amp (A), and is placed in close proximity to the lower end of the rod 170 as well as to the falling rod's trajectory in order to optimize the reflected signal received. The DC power supply 150 also provides the current for the electromagnet 140.

The rod 170 is attached to the electromagnet 140 and is held still for few seconds to ensure that the fall will be perfectly vertical. To ensure vertical free falling, a leveling of the electromagnet can be verified, for example, with a spirit level. Also, when utilizing the apparatus 100, air conditioning units or fans in the vicinity of the apparatus 100 can be turned off in order to eliminate a possible effect of air streams that could influence the free-fall conditions of the object, and incandescent lights or other sources of interfering IR illumination in the vicinity of the apparatus 100 can be extinguished before use.

When the electromagnet 140 is switched off, the rod 170 is released from rest. Emitted IR light from the IR LED 132 is reflected by the rod 170 as it falls past the IR transceiver 130, and received by the IR photodiode 134. As a result, a non-periodic rectangular wave will be recorded. The distinct 5 V peaks correspond to the reflected signal received by the IR photodiode while a reflective portion 171 of the rod 170 is being illuminated by IR LED 132. The 0 V valleys correspond to the reflected signal received by the IR photodiode while a non-reflective portion 172 of the rod 170 is being illuminated by IR LED 132.

Figure 3:
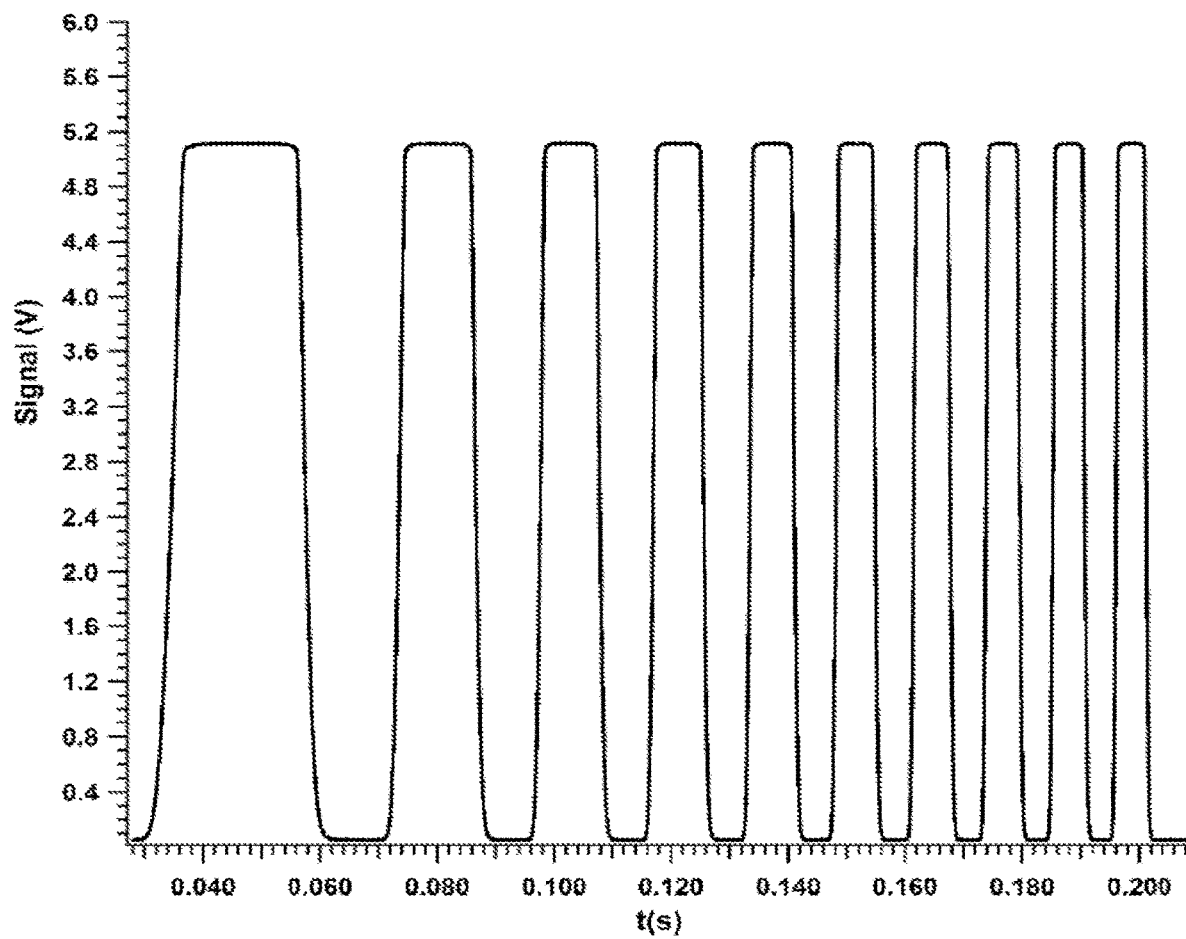
FIG. 3 illustrates an exemplary output of the IR transceiver.

FIG. 3 illustrates an exemplary output of the IR transceiver. FIG. 3 shows a signal output by the IR transceiver 130 (in volts) versus elapsed time (in seconds) for 19 total stripes (10 white and 9 black), each stripe having a fixed 0.01 m width. A technique used to determine the corresponding beginning or end time of either the white or black stripes is as follows. The beginning time of each white stripe is determined to be the start of the rise of the peak, and the ending time of the white stripe is determined to be the beginning of the fall of the peak. The beginning time of the black stripes is determined to be the beginning of the fall of the peak, and the end of the black stripe is determined to be the start of the rise of the following peak.

An observed trend of the width of the peaks is to decrease as a function of elapsed time. This trend is expected as the width of each peak corresponds to the time of fall of that stripe. The widest peak (0.0254 s), to the left in FIG. 3, corresponds to time of fall of the first white stripe at the lower end of the falling rod 170, whereas, the narrowest peak (0.0055 s), to the right in FIG. 3, corresponds to the fall time of the top white stripe of the falling rod 170. Since the width of each stripe is fixed at 0.01 m, from FIG. 3 it is clear that during the fall the lower end of the rod 170 passed the IR transceiver 130 with lower speed than the upper end of the rod 170. In other words, the free falling rod 170 is experiencing an acceleration due only to gravity, which causes the observed increase in its speed as the rod falls.

Figure 4:
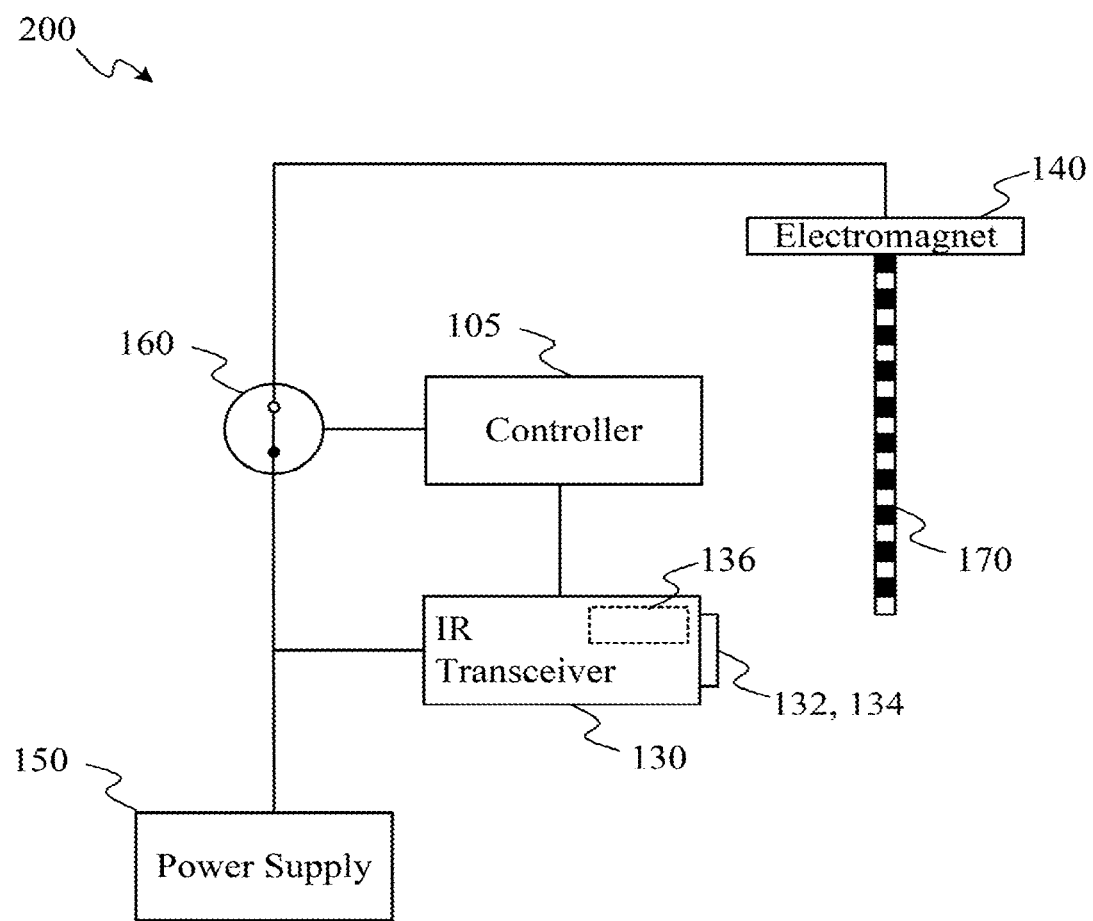
FIG. 4 illustrates an exemplary embodiment of an apparatus for measuring a local acceleration of gravity.

FIG. 4 illustrates a second exemplary embodiment of an apparatus 200 for measuring a local acceleration of gravity. Like elements of the apparatus 200 to the apparatus 100 are given a same number, and are not described again.

In the embodiment of FIG. 4, a controller 105 is configured to operate the apparatus 200. The controller 105 performs the functions of the digital oscilloscope 180, including receiving the output signal sent from the IR transceiver 130 via the output circuit 136. Additionally, the controller is able to start and stop emission of IR light by the IR LED 132 in the IR transceiver 130. The IR LED 132 and the IR photodiode 134 lie one behind the other from the perspective of FIG. 4, at the same height.

The controller 105 is also electrically connected to a switch 160, so as to be able to cause the switch 160 to open and close. The electromagnetic 140 is connected to the DC power supply 150 through the switch 160. When the controller 105 opens the switch 160, current does not flow to the electromagnet 140, and the rod 170 is released by the electromagnet. When the controller 105 closes the switch 160, the electromagnet 105 generates a magnetic field, and will hold the ferrous rod 170.

Figure 5:
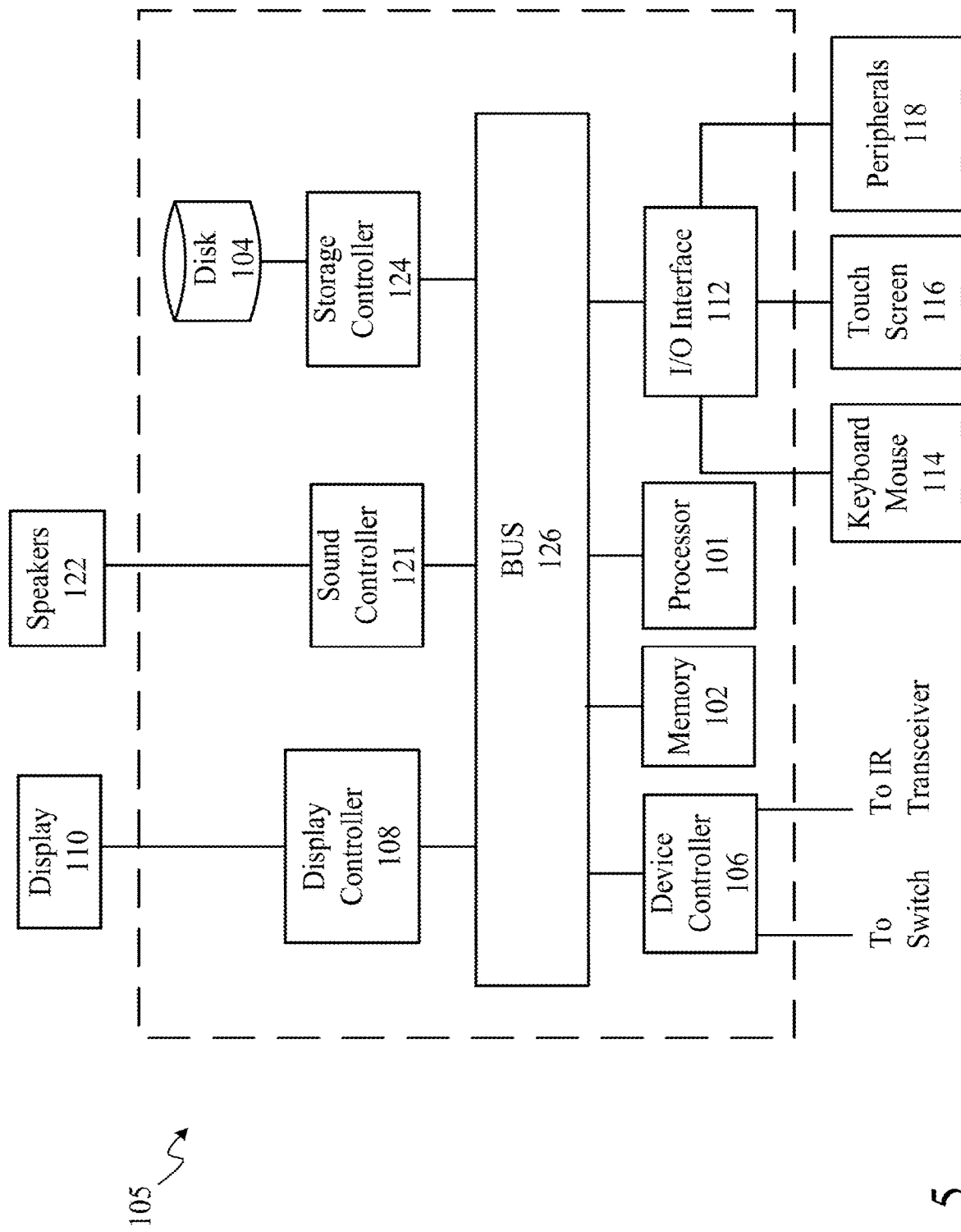
FIG. 5 illustrates an exemplary controller in an apparatus for measuring a local acceleration of gravity according to an aspect of the disclosure.

FIG. 5 illustrates exemplary controller 105 in the apparatus 200 for measuring a local acceleration of gravity according to an aspect of the disclosure. In FIG. 4, the controller 105 includes a processor 101 which performs the processes described above and below. The process data and instructions may be stored in memory 102. These processes and instructions may also be stored on a storage medium disk 104 such as a hard drive (HDD) or a portable storage medium, or may be stored remotely. Further, the apparatus 200 is not limited by the form of the computer-readable media on which the instructions for the process are stored. For example, the instructions may be stored on CDs, DVDs, in FLASH memory, RAM, ROM, PROM, EPROM, EEPROM, hard disk, or any other information processing device with which the controller 105 communicates, such as a server or other computer. Further, the functionality may be provided as a utility application, background daemon, or component of an operating system, or combination thereof, executing in conjunction with the processor 101 and an operating system such as Microsoft Windows 7, UNIX, Solaris, LINUX, Apple MAC-OS, and other systems known to those skilled in the art.

The hardware elements used in order to achieve the controller 105 may be realized by various circuitry elements known to those skilled in the art. For example, processor 101 may be a Xenon or Core processor from Intel of America, or an Opteron processor from AMD of America, or may be other processor types that would be recognized by one of ordinary skill in the art. Alternatively, the processor 101 may be implemented on an FPGA, ASIC, PLD, or using discrete logic circuits, as one of ordinary skill in the art would recognize. Further, processor 101 may be implemented as multiple processors cooperatively working in parallel to perform the instructions of the inventive processes described above.

The controller 105 in FIG. 5 also includes a device controller 106. The device controller includes one or more chips or expansion cards, connected to and configured to control the switch 160 and the IR transceiver 130. These may be configured as, for example, serial or parallel port connections, Ethernet connections, or the like, as appropriate for the switch 160 and the IR transceiver 130, respectively. The device controller 106 provides for all communications required, control or data, between the controller 105 and the switch 160 and the IR transceiver 130.

The controller 105 further includes a display controller 108, such as a NVIDIA GeForce GTX or Quadro graphics adaptor from NVIDIA Corporation of America for interfacing with display 110, such as a Hewlett Packard HPL2445w LCD monitor. A general purpose I/O interface 112 interfaces with a keyboard and/or mouse 114 as well as a touch screen panel 116 on or separate from display 110. General purpose I/O interface also connects to a variety of peripherals 118 including printers and scanners, such as an OfficeJet or DeskJet from Hewlett Packard.

A sound controller 120 is also provided in the controller 105, such as Sound Blaster X-Fi Titanium from Creative, to interface with speakers/microphone 122, thereby providing sounds and/or music.

The general purpose storage controller 124 connects the storage medium disk 104 with communication bus 126, which may be an ISA, EISA, VESA, PCI, or similar, for interconnecting all of the components of the controller 105. A description of the general features and functionality of the display 110, keyboard and/or mouse 114, as well as the display controller 108, storage controller 124, network controller 106, sound controller 120, and general purpose I/O interface 112 is omitted herein for brevity, as these features are known.

Figure 6:
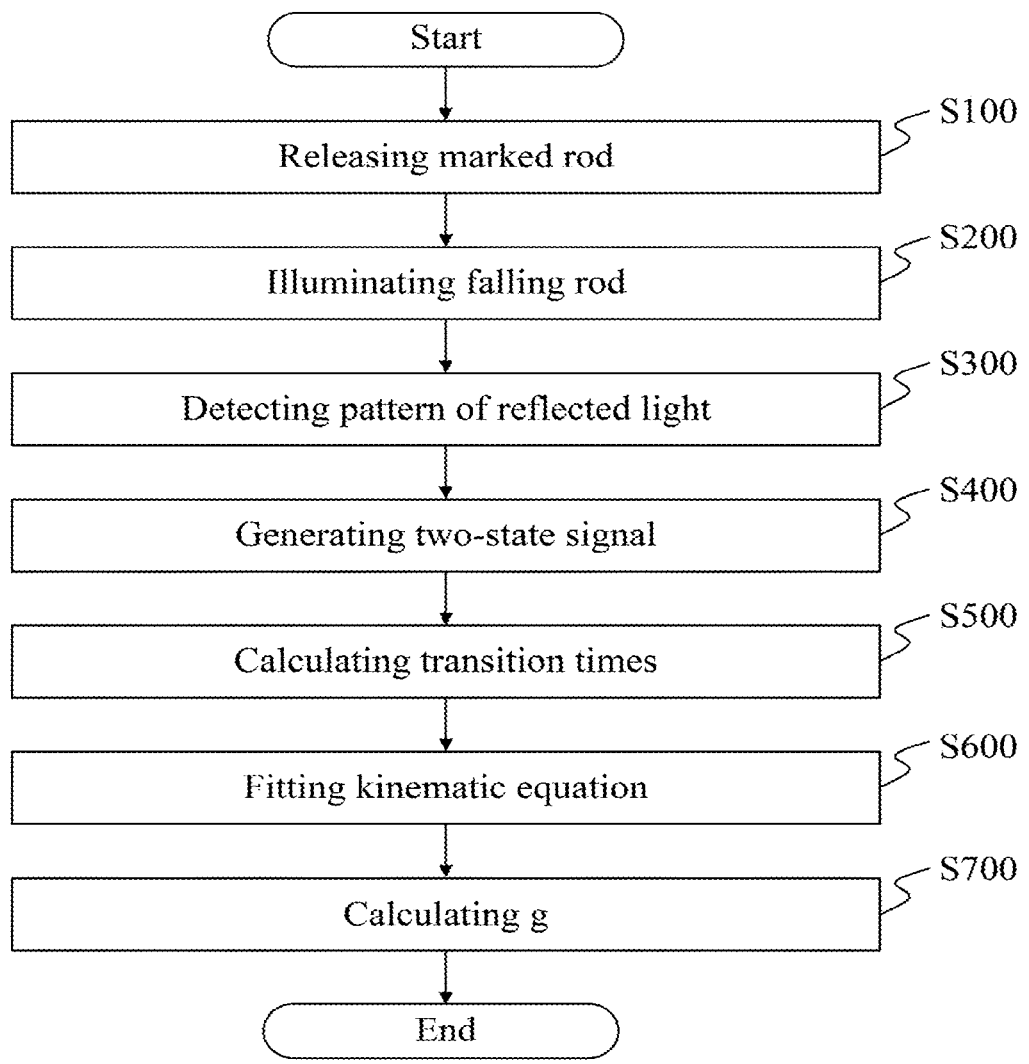
FIG. 6 is a flowchart illustrating an exemplary embodiment of a method for measuring a local acceleration of gravity.

FIG. 6 is a flowchart illustrating an exemplary embodiment of a method for measuring a local acceleration of gravity. At step S100, the rod 170 marked with the regular alternating pattern of reflective and non-reflective portions is released from the electromagnet 140 by the controller 105 causing the switch 160 to open.

At step S200, the falling rod 170 is continuously illuminated by the IR LED 132 as the rod falls past the IR transceiver 130. The reflected light from the falling rod 170 is modulated by the regular alternating pattern of reflective portions and non-reflective portions on rod 170. At step S300 the pattern of reflected IR light is continuously detected by the IR photodiode 134.

At step S400, the output circuit 136 generates a two-state output signal corresponding to a detected illumination state of the IR photodiode 134 by reflected IR light. The two-state output signal has a high state and a low state. The high state may take a value of, for example, 5 V, and corresponds to the IR photodiode detecting IR light emitted by the IR LED 132 and reflected by a reflective portion 171 of the rod 170. The low state may take a value of, for example, 0 V, and corresponds to the IR photodiode detecting IR light emitted by the IR LED 132 and incident on a non-reflective portion 172 of the rod 170.

At step S500, the processor 101 calculates the times of the transitions in the output signal from the output circuit 136. The processor 101 calculates the times of both rising edge transitions and falling edge transitions. Each transition represents a distance corresponding to the regular interval in the alternating pattern passing at the particular time of the transition. The transitions may be identified, for example, by a change in voltage of greater than a threshold voltage from one of the two state voltage levels. For example, the voltage threshold can be set at 0.1 V. Then, a transition from the low state to the high state is determined to be when the voltage increases from 0 V to 0.1 V. Similarly, a transition from the high state to the low state is determined to be when the voltage decreases from 5 V to 4.9 V. Alternatively, a more complicated algorithm known to one of ordinary skill in the art may be used for calculating the times of the transitions.

This produces a time for each transition. However, from the geometry of the regular alternating pattern on the rod 170, a distance between each transition is also known. For example, if each reflective portion 171 and each non-reflective portion 172 is 1.0 cm in length, then there is 1.0 cm between each transition. Combining the characterizations of the transitions in time and distance, a set of data points including a position and time for each transition is produced.

At step S600, the processor 101 fits the position and time data points determined from the transitions to the kinematic equation for a falling body. The one dimensional equation of motion under constant acceleration is known to be a second order polynomial in time. Therefore, the y(t) versus t data is fit to a polynomial of second degree $$y(t)=a_0+a_1 t+a_2 t^2$$

using an ordinary least squares estimation to determine the values of the coefficients $a_0$, $a_1$, and $a_2$.

Figure 7:
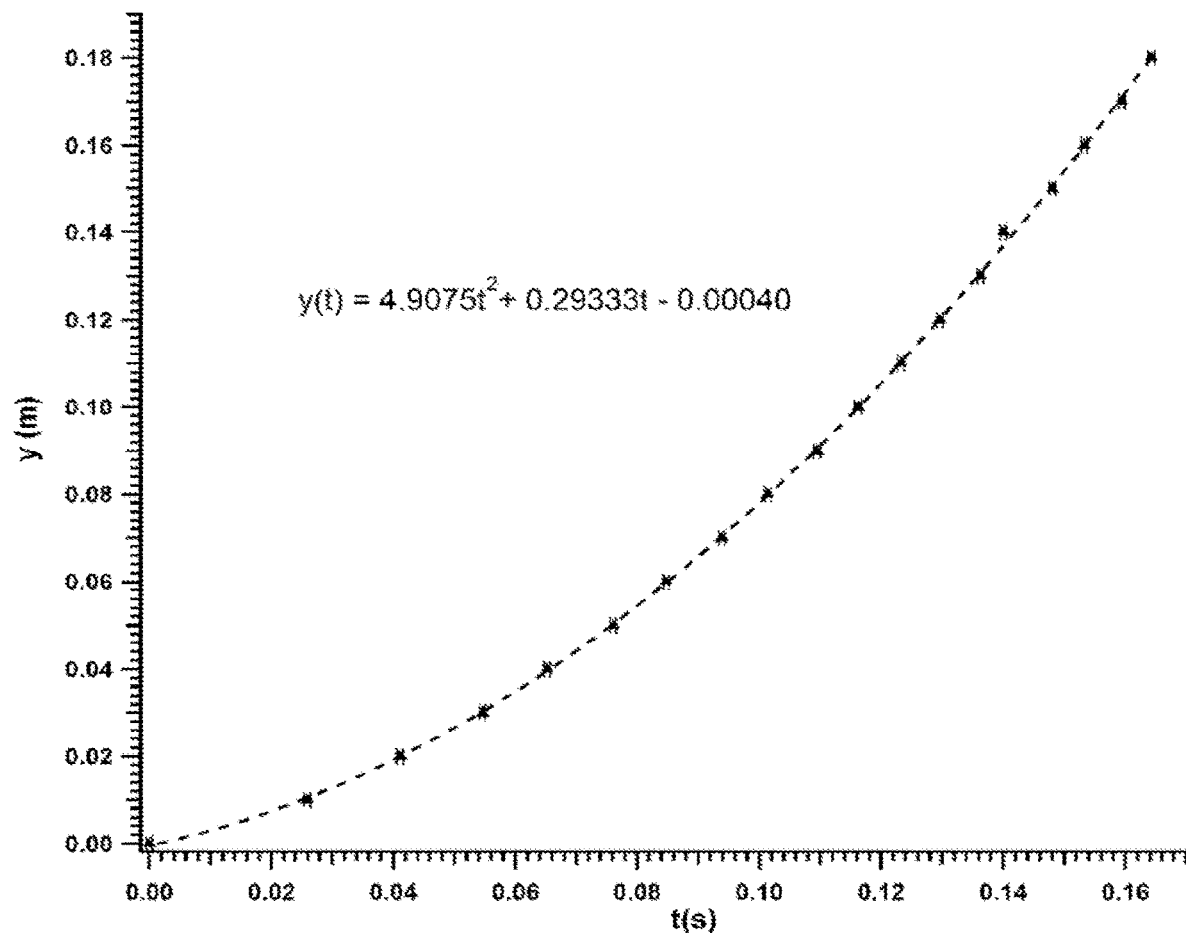
FIG. 7 illustrates an exemplary curve fit of data to show the local acceleration of gravity in an aspect of the disclosure.

FIG. 7 illustrates an exemplary curve fit of data to show the local acceleration of gravity in an aspect of the disclosure using ordinary least squares estimation. FIG. 6 shows the time of the stripes relative to the start of ascending of the IR reflected signal of the first white stripe (choosing the initial data point to be at $y_0=t_0=0$) versus the elapsed time of fall in seconds. For the rod 170 having 10 reflective portions 171 and 9 non-reflective portions 172, the 19 data points follow a quadratic curve.

At step S700, the processor 101 calculates a local acceleration of gravity g using the coefficients obtained from the fitting at step S600. To extract the value of acceleration due to gravity, we utilize the one dimensional equation of motion under constant acceleration, which is commonly given as $$y(t)=y_0+v_0 t+\tfrac{1}{2}g t^2.$$

By comparing the coefficients of the quadratic fit to the equation of motion, it is possible to extract a value of the acceleration due to gravity. The acceleration of gravity, g, is calculated as twice the coefficient $a_2$ obtained from the fit. This completes the method for calculating a local acceleration of gravity.

In order to improve the precision and accuracy of the experiment, the method may be repeated N times, for example, 25 times. This may be accomplished either by repeating steps S100 through S500 N times and at step S600 fitting the entire data set of all position and time data points from the N repetitions, or by executing steps S100 through S700 N times to calculate N values of 9, and then finding the average value $\bar{g}$ of the N values of g.

While certain embodiments have been described herein, these embodiments are presented by way of example only, and are not intended to limit the scope of the disclosure. Indeed, using the teachings in this disclosure, a person having ordinary skill in the art could modify and adapt the disclosure in a various ways, making omissions, substitutions and changes in the form of the embodiments described herein without departing from the spirit of the disclosure. Moreover, in interpreting the disclosure, all terms should be interpreted in the broadest possible manner consistent with the context. The accompanying claims and their equivalents are intended to cover such forms or modifications as would fall within the scope and spirit of the disclosure.

For example, the fitting the position and time data points determined from the transitions can also be accomplished by other methods available to one of ordinary skill in the art, for example, by a weighted least squares approach or another linear regression model.

We claim:

1. A measurement apparatus with circuitry for measuring a local acceleration of gravity, the apparatus comprising:
   a ferrous rod having a regular alternating pattern of reflective and non-reflective portions on a surface thereof;
   an electromagnetic holder mounted on a vertical beam configured to releasably hold the ferrous rod;
   an infrared (IR) transceiver including
      a light emitting diode (LED) configured to emit IR light,
      a photodiode configured to detect IR light emitted by the LED which is reflected back to the IR transceiver, wherein the light emitting diode (LED) and the photodiode are disposed at the same height beneath the electromagnetic holder, and
      an output circuit configured to output a two-state signal in the form of a non-periodic two-state rectangular wave at 5 V and 0 V levels corresponding to an illumination state and a non-illumination state of the photodiode by the reflected IR light;
   a power supply configured to the power the electromagnetic holder and the IR transceiver; and
   circuitry configured to:
      control a current from the power supply to the electromagnetic holder to the cause electromagnetic holder to release the rod,
      cause the IR transceiver to emit IR light,
      receive a signal from the IR transceiver,
      calculate times of transitions between the two states in the received signal to determine kinematic data, and
      calculate a local acceleration of gravity from a fit to the kinematic data.

2. The apparatus according to claim 1, wherein the rod has a substantially cylindrical shape.

3. The apparatus according to claim 1, wherein the alternating pattern is formed at regular intervals of 1 centimeter.

4. The apparatus according to claim 1, where in the alternating pattern is formed by etching a surface of the rod.

5. The apparatus according to claim 1, wherein the alternating pattern is formed by applying a black resin, epoxy, or paint to a surface of the ferrous rod.

6. The apparatus according to claim 5, wherein transitions between the reflective portions and the non-reflective portions of the alternating pattern are blurred by varying a concentration of an IR absorber in the black resin, epoxy, or paint in a portion of the alternating pattern at the transition.

7. The apparatus according to claim 5, wherein the surface of the rod is shaped in a pattern corresponding to the reflective portions and the non-reflective portions of the rod.

8. The apparatus according to claim 7, wherein the surface of the rod is shaped in a concave pattern corresponding to the reflective portions and the non-reflective portions of the rod.

* * * * *